Oct. 20, 1953  K. R. JACKSON  2,655,940
TIME-MODULATED TWO-STAGE HYDRAULIC VALVE
Filed Jan. 9, 1950  3 Sheets-Sheet 1

INVENTOR.
KENNETH R. JACKSON
BY William R. Lane
ATTORNEY

Patented Oct. 20, 1953

2,655,940

UNITED STATES PATENT OFFICE 2,655,940

TIME-MODULATED TWO-STAGE HYDRAULIC VALVE

Kenneth R. Jackson, Alhambra, Calif., assignor to North American Aviation, Inc.

Application January 9, 1950, Serial No. 137,655

10 Claims. (Cl. 137—623)

This invention pertains to a hydraulic valve, and particularly to an actuator valve adapted to receive an electrical signal and to respond by controlling the flow of a hydraulic fluid. In the past, the control of large forces by hydraulic means has been complicated by the fact that the hydraulic valves necessary to control the fluid flow in the hydraulic system have been relatively slow to respond and suffered from the tendency to stick or clog at high pressure and high temperature.

It is therefore an object of this invention to provide a hydraulic valve system having high inherent speed.

It is a further object of this invention to provide a hydraulic valve system which is electrically controlled.

It is a further object of this invention to provide a hydraulic valve system which does not stick or clog at high pressure and high temperature.

It is a further object of this invention to provide an electrically controlled hydraulic valve employing time modulation of the controlling electric signal.

It is a further object of this invention to provide a hydraulic pilot-slave valve in which the motion of the pilot valve is time-modulated.

Other objects of invention will become apparent from the following description taken in connection with the accompanying drawings, in which.

Figure 3:
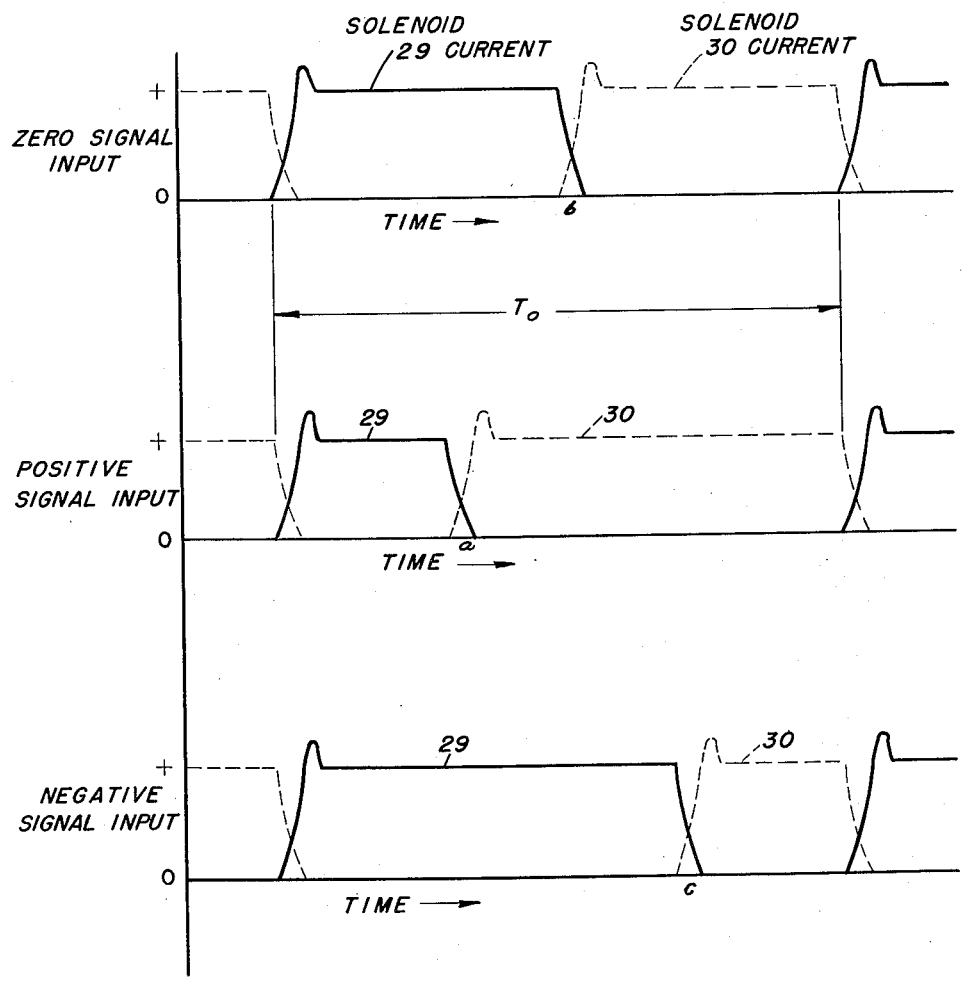

And Fig. 3 is a plot of solenoid current versus time over one time-modulated cycle of the device.

Figure 1:
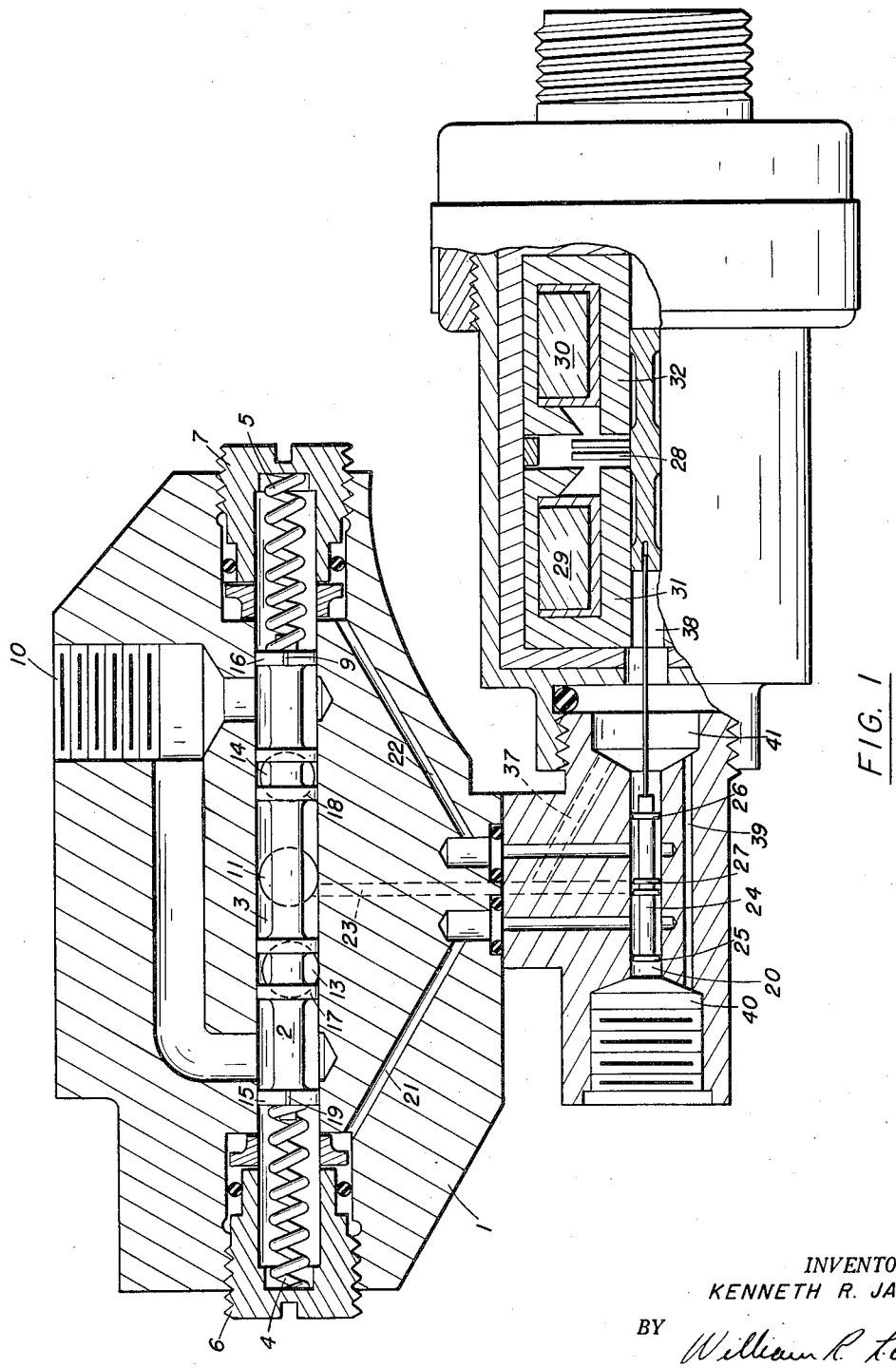
Fig. 1 is a sectional view of the invention.

Referring to Fig. 1, a valve block 1 encloses slave valve spool 2 in slave valve chamber 3 bored in block 1. Springs 4 and 5 held in place by slave valve spool 2 and end nuts 6 and 7 serve to center slave valve spool 2. Valve block 1 is equipped with pressure port 10 to which high pressure hydraulic fluid is furnished, a return port 11 which communicates with the hydraulic sump and actuator ports 13 and 14 which communicate with opposing sides of a hydraulic piston or other hydraulically actuable device. Slave valve spool 2 is equipped with end lobes 15 and 16 and center lobes 17 and 18. End lobes 15 and 16 have small notches 9 and 19 cut in their peripheries for a purpose to be hereinafter related. The spaces between end nuts 6 and 7 and the body of valve block 1 communicate with pilot valve chamber 20 through conduits 21 and 22, and pilot valve chamber 20 communicates with return port 11 through channel 23. Pilot valve 24 is equipped with end lobes 25 and 26 and double center lobe 27 and is mechanically actuated by a wire which is driven by the action of clapper 28 whose movement is in turn controlled by solenoids 29 and 30 wound on iron cores 31 and 32 as shown.

Figure 2:
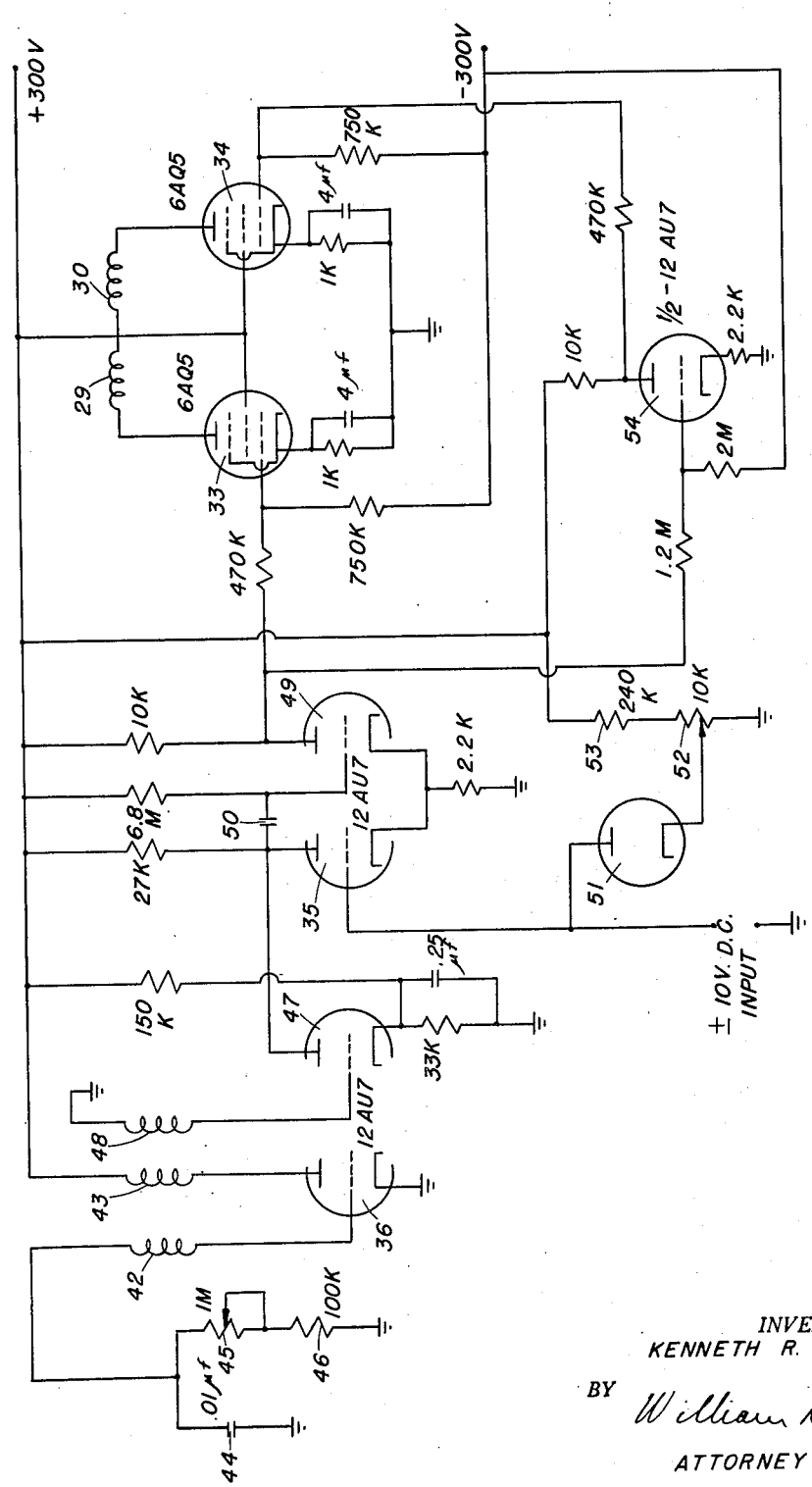
Fig. 2 is a wiring diagram of the invention.

Referring now to Fig. 2, solenoids 29 and 30 are actuated by power received from push-pull drivers 33 and 34, which in turn are driven by time modulators 35 and 49 pulsed by blocking oscillator 36. A time modulator or time modulation circuit is defined as that class of circuits that can alter or modulate the time interval which elapses between the occurrence of an identifiable portion of the same or a different wave form. A time-modulated device is defined as a device subjected to a constant frequency oscillatory movement having positive and negative half cycles of variable time intervals. The time during which the device is moved in a given direction is varied rather than the frequency or the amplitude of that motion. A control signal is applied to the grid of time modulator 35, as shown in Fig. 2, and serves to control the time during which pilot valve 24 is allowed to remain displaced on either side of the intersection of channel 23 and pilot valve chamber 20.

Referring again to Fig. 1, channel 37 communicates between channel 23 and chamber 38 in which clapper 28 moves. Likewise, channel 39 connects end chambers 40 and 41 of the pilot valve.

In operation, let us assume initially that the grid of triode 36 is sufficiently negative to barely allow flow of current through the tube. Increase of flow of current through the tube induces a voltage in winding 42 of pulse transformer 43 which causes the grid of triode 36 to be driven more positive, thus further increasing the flow of current in triode 36. This increase in current through the tube drives the grid rapidly more positive until the flow of current through the tube reaches a maximum which is dependent upon the physical characteristics of the tube and the supply voltage. When the current reaches a maximum value, winding 42 no longer picks up voltage and the grid voltage of triode 36 decreases as the positive charge leaks off of capacitor 44, cutting off conduction of the tube. As the flow of current through tube 36 decreases, a large negative voltage is induced in winding 42 which causes the grid of triode 36 to be driven more negative, thus further decreasing the flow of current in triode 36. When the negative charge of condenser 44, induced by the aforementioned current flow through winding 42, has had time to leak off through resistances 45 and 46, the condition initially assumed again obtains and the process of current flow buildup previously described repeats. The result is that a series of pulses of constant frequency is delivered to the grid of triode 47 through winding 48 of the pulse transformer. This series of pulses is fed to triode 35 and to the grid of triode 49 through condenser 50. A controlling signal is applied to the grid of triode 35 which influences the way in which triodes 35 and 49 deal with the pulse output of triode 47. A limiting diode 51 with resistances 52 and 53 serve to limit the positive D. C. input signal applied to the grid of triode 35. If it is assumed that triode 49 is conducting, since the cathodes of triodes 35 and 49 are connected together, the cathode of triode 35 will be positive with respect to its grid when a fairly heavy current is flowing in triode 49. Triode 35 will therefore be positively prevented from conducting. However, when a heavy negative pulse is received on the plate of triode 35 from the plate of triode 47, and on the grid of triode 49 through capacitor 50, the relative voltages on the cathode and plate of triode 35 will be such that current will commence to flow through triode 35 and nearly cease to flow through triode 49. Triode 49 will be cut off for a period of time which is dependent upon the voltage applied to the grid of triode 35. The output of the plate of triode 49 will therefore be a rectangular wave voltage which is time-modulated by the D. C. input signal applied to the grid of triode 35. In other words, the time at which triode 35 cuts off and triode 49 commences to conduct is controlled by the magnitude of the D. C. input signal applied to the grid of triode 35. This time-modulated signal is applied to the control grid of pentode 33 through tube 49, and to the control grid of pentode 34 through phase inverter 54. Solenoids 29 and 30, therefore, receive a rectangular wave signal which is time-modulated in response to the D. C. input signal applied to triode 35, as shown in Fig. 3. The period of the rectangular wave, $T_0$ in Fig. 3, is constant, but the point at which the current reverses in direction may be varied continuously between any two non-central points, such as $a$ and $c$ in Fig. 3. If the current reverses at point $b$, representing a time equal to half the period of the square wave, no displacement of the slave valve results. While it is recognized that other time-modulation schemes adapted to achieve the same or a similar wave form as that shown in Fig. 3 might be employed, the circuit shown in Fig. 2 embodies the basic principle of any such schemes.

Referring now to Fig. 2, the application of the time-modulated rectangular wave signal to solenoids 29 and 30 causes clapper 28 to oscillate horizontally and hence causes the center lobe of pilot valve 24 to uncover channel 23, first on one side of the center lobe and then on the other side of the center lobe. If the times spent by the center lobe on each side of the centered position are equal, a small amplitude oscillation of slave valve 2 results. However, if pilot valve 24 is displaced from its center position on one side for a greater percentage of time of each rectangular wave cycle than on the other side, movement of slave valve 2 will result. Assuming that clapper 28 is caused to spend a higher percentage of its cycle on the left side of the centered position, fluid will escape through channels 22 and 23 to the return port and will cause a net loss of static pressure on the end of end lobe 16. While springs 4 and 5 tend normally to keep slave valve 2 in centered position, the reduction of fluid pressure in the chamber housing and the action of springs 4 and 5 will cause rapid displacement of slave valve 2 to the right. Displacement of slave valve 2 to the right allows pressure from high pressure port 10 to enter actuator port 13 and allows return of fluid from the external hydraulic machinery through port 14 because of the movement of center lobes 17 and 18 of the slave valve. Actuation of the external hydraulic apparatus is therefore accomplished and may be controlled by controlling the signal applied to triode 35 of Fig. 2.

If no signal is applied to triode 35, pilot valve 24 oscillates about its center position in such a way that the pressure drop across notch 19 is the same as across notch 9. However, the application of a negative voltage to triode 35 results in an increase in the time spent by center lobe 27 on one side of the intersection of channel 23 and pilot valve chamber 20 so that movement of the slave valve results. Because the pilot valve is under continual acceleration and moves with the same amplitude whether a control signal is applied or not, the likelihood of the pilot valve sticking under conditions of high pressure and high temperature is minimized. A valve constructed essentially as described has been found to be capable of controlling 6 H. P. in response to an input signal of less than one watt. Because of the small movement required of the pilot valve, clapper 28 can be very close to the magnetic gaps in iron cores 31 and 32. This arrangement makes for relatively high acceleration of pilot valve 24. The minimum acceleration applied to clapper 28 and pilot valve 24 is in the neghiborhood of 150 g's. With high accelerations applicable to pilot valve 24, the valve as a whole attains very high speed operation. If a pressure of the order of 3,000 pounds per square inch is applied to the pressure port, and a signal of 10 volts is applied to the grid of triode 35, this results in an amplitude of movement of the pilot valve of .003 inch, a movement of the slave valve of .040 inch, and the application of approximately 6 H. P. to an external actuator. The over-all size of the valve is small in comparison with the valves capable of controlling the same amount of power, and the control is exerted with greater speed than can be achieved with previously known valves. Because the pilot valve is continuously moving regardless of the volume of flow desired through the slave valve, the danger of the pilot valve sticking or "freezing" at high temperature or pressure is minimized. This valve has been found to operate successfully for long periods at temperatures as high as 350° F.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Regulating means comprising a plurality of fluid channels arranged in parallel, means for causing the flow of fluid into said plurality of channels from a common source, means for restricting the flow in said plurality of channels, a single channel, means for re-combining the flow in said plurality of channels into said single channel, flow regulating means positioned to regulate the flow of fluid from each of said plurality of channels into said single channel, and time-modulator means having a time-modulated output signal connected to actuate said flow regulating means in response to said modulated signal thereby regulating the differential pressure in said plurality of channels.

2. A device as recited in claim 1 in which said means for re-combining the flow in said plurality of channels into said single channel comprises a pilot valve chamber communicating near its ends with said plurality of channels and at its center with said single channel, in which said flow regulating means comprises the pilot valve connected between said single channel and each of said plurality of channels, and in which said time-modulator means comprises a double solenoid electromagnetic actuator operatively associated with said pilot valve, and generator means having a time-modulated electrical driving signal output connected to said solenoids to thereby time modulate the flow of fluid from said plurality of channels to said single channel.

3. A device as recited in claim 1 and further comprising valve means responsive to said differential pressure and connected to regulate the flow of fluid in a hydraulic system whereby said flow of fluid is responsive to said time-modulating means.

4. A device as recited in claim 1 in which said plurality of channels comprises the two channels, and in which said flow regulating means comprises a moveable mass positioned to selectively block the flow from either of said two channels into said single channel, said mass being too small to prevent completely said flow from both of said two channels whereby the movement of said movable mass regulates the pressure differential between said two channels in response to said time-modulator means.

5. A time-modulated hydraulic valve comprising a plurality of fluid channels arranged in parallel, means for causing the flow of fluid into said plurality of channels from a common source, means for restricting the flow in said plurality of channels, a single channel, means for combining the flow in said plurality of channels into said single channel, time-modulation means having a time-modulated output positioned in said plurality of channels to time modulate the flow from each of said plurality of channels into said single channel, and means responsive to the differential of fluid pressure in said plurality of channels for controlling the flow of fluid in a hydraulic system to thereby control the flow of fluid in said hydraulic system in response to said time-modulating means.

6. A device as recited in claim 5 in which said means responsive to the differential of fluid pressure comprises a valve block having a cylindrical chamber, a slidable valve element in said chamber having two centrally disposed lobes and two end lobes incorporating said restricting means, two springs in the ends of said cylindrical chamber adapted to hold said valve element in centered position in said chamber, two working ports leading from said chamber similar in diameter to the length of said centrally located lobes and located so as to be covered when said valve element is centered, a return port leading from the portion of said chamber between said centrally disposed lobes to said common source of fluid, and a branched pressure port connected to supply fluid from said common source to said chamber in the space adjacent and inboard from said end lobes whereby said time-modulated means creates a differential of pressure on the ends of said valve element displacing said centrally disposed lobes from said two working ports, allowing fluid from one branch of said pressure port to enter one of said working ports, and fluid from the other of said working ports to enter said return port to thereby control the flow of hydraulic fluid in a hydraulic system.

7. Means for controlling the flow of fluid comprising means for producing an alternating electrical signal of substantially rectangular wave form, means responsive to a direct current control signal for time modulating said alternating signal, two fluid flow channels arranged in parallel and adapted to receive a flow of fluid from a common source, means for restricting the flow in each of said two channels, a single channel arranged to return fluid to said common source, means for combining the flow in said two channels into said single channel, a pilot valve having at least one centrally located lobe centered over the junction between said two channels and said single channel, a solenoid positioned to displace said pilot valve from said centered position in one direction in response to said time-modulated signal, a second solenoid positioned to displace said pilot valve from said centered position in the opposite direction in response to said time-modulated signal, and means responsive to the differential of fluid pressure in said two channels for controlling the flow of fluid in a hydraulic system to thereby control the flow of fluid in said hydraulic system in response to said direct current control signal.

8. A device as recited in claim 7 in which said means for producing an alternating electrical signal of substantially rectangular wave form comprises a blocking oscillator, a phase inverter, and a push-pull power amplifier connected to said solenoid, the signal from said blocking oscillator being fed to said time modulator and thence through said phase inverter to said power amplifier to thereby time modulate the motion of said pilot valve.

9. A device as recited in claim 7 in which said means responsive to the differential pressure in said two channels for controlling the flow of fluid in the hydraulic system comprises a valve block having a cylindrical chamber, a slideable cylindrical valve element in said chamber having two centrally disposed cylindrical lobes located approximately at the two-thirds points thereof, and two end lobes incorporating said means for restricing flow, two springs in the ends of said cylindrical chamber adapted to hold said element in centered position in said chamber, two working ports connected to external hydraulic machinery and leading from said chamber and similar in diameter to the length of said centrally located lobes and intersecting said chamber so as to be covered when said valve element is in said centered position, a return port leading from the portion of said chamber between said centrally disposed lobes to said common source of fluid, and a branched pressure port connected to supply fluid from said common source to said chamber in the space adjacent and inboard from said end lobes whereby said direct current control signal creates a differential of pressure on the ends of said valve element displacing said centrally disposed lobes from said two working ports, allowing fluid from said branch of said pressure port to enter one of said working ports and fluid from the other of said working ports to enter said return port to thereby control the flow of hydraulic fluid in a hydraulic system in response to a direct current electrical control signal.

10. Means for controlling the flow of hydraulic fluid comprising a valve block, an inlet port, an outlet port, two power ports, a pilot valve connected between said inlet port and said outlet port, a slave valve hydraulically subjected to the movement of said pilot valve and having two control lobes positioned to selectively connect said power ports to said inlet and outlet ports, time-modulator means having a time-modulated constant frequency oscillatory output, and a double-acting actuator operatively associated with said pilot valve and subjected to the output of said time-modulator means whereby said pilot valve oscillates at a time-modulated frequency and actuation of said slave valve is a measure of the timing of said output of said time-modulator means.

KENNETH R. JACKSON.

References Cited in the file of this patent
UNITED STATES PATENTS

| Number | Name | Date |
|---|---|---|
| 335,855 | Toole | Feb. 9, 1886 |
| 1,518,894 | Bliss | Dec. 9, 1924 |
| 2,398,421 | Frische | Apr. 16, 1946 |
| 2,439,711 | Bovey | Apr. 13, 1948 |
| 2,455,315 | Rose | Nov. 30, 1948 |